(12) United States Patent
Bowers

(10) Patent No.: US 8,505,673 B2
(45) Date of Patent: Aug. 13, 2013

(54) CONTROL SYSTEM FOR A VEHICLE

(75) Inventor: Lee N. Bowers, Springfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 16 days.

(21) Appl. No.: 13/323,013

(22) Filed: Dec. 12, 2011

(65) Prior Publication Data
US 2013/0146385 A1 Jun. 13, 2013

(51) Int. Cl.
*B60K 20/02* (2006.01)

(52) U.S. Cl.
USPC .......... 180/333; 180/19.3; 180/315; 180/324; 74/488; 477/173

(58) Field of Classification Search
USPC ................. 180/19.3, 332–334, 315; 74/488; 477/173; 200/61.85
See application file for complete search history.

(56) References Cited

U.S. PATENT DOCUMENTS

| | | | |
|---|---|---|---|
| 3,426,458 A | 2/1969 | Spitzer | |
| 3,842,653 A * | 10/1974 | Blonn, Sr. | 477/96 |
| 4,554,751 A | 11/1985 | Nicolosi et al. | |
| 4,807,375 A | 2/1989 | Iraci | |
| 5,038,881 A * | 8/1991 | Wysocki et al. | 180/184 |
| 5,485,690 A | 1/1996 | MacQueen | |
| 5,492,511 A * | 2/1996 | Kozminski | 477/27 |
| 5,615,745 A | 4/1997 | Cross | |
| 5,857,385 A * | 1/1999 | Takeuchi | 74/489 |
| 5,901,476 A | 5/1999 | Buonfiglio | |
| 5,950,336 A | 9/1999 | Liebl | |
| 5,967,241 A | 10/1999 | Cross et al. | |
| 6,334,269 B1 * | 1/2002 | Dilks | 37/235 |
| 6,762,377 B2 * | 7/2004 | Abrahamson | 200/61.85 |
| 6,835,904 B2 * | 12/2004 | McGuire et al. | 200/61.87 |
| 6,955,404 B1 * | 10/2005 | Best et al. | 298/1 C |
| 6,957,505 B1 | 10/2005 | Moffitt | |
| 6,964,121 B2 | 11/2005 | Harris | |
| 7,677,771 B2 * | 3/2010 | Yamamoto et al. | 362/474 |
| 8,006,798 B2 * | 8/2011 | Portelance | 180/336 |
| 2002/0007574 A1 | 1/2002 | Williams | |
| 2005/0000120 A1 | 1/2005 | Potak | |
| 2006/0076197 A1 * | 4/2006 | Ishida | 188/72.8 |
| 2010/0307856 A1 * | 12/2010 | Hahn | 180/333 |
| 2013/0030604 A1 * | 1/2013 | Ohshima et al. | 701/1 |

* cited by examiner

*Primary Examiner* — Joseph Rocca
*Assistant Examiner* — Darlene P Condra
(74) *Attorney, Agent, or Firm* — Ulmer & Berne LLP

(57) ABSTRACT

A control system for a saddle-type vehicle is provided. The control system includes a reverse lever, a hand brake lever, a throttle lever and at least one mount bracket. Each of the reverse lever, the hand brake lever and the throttle lever are pivotably coupled to the at least one mount bracket and the at least one mount bracket is configured to be connected to a first one of a right handlebar and a left handlebar of a saddle-type vehicle.

17 Claims, 3 Drawing Sheets

US 8,505,673 B2

CONTROL SYSTEM FOR A VEHICLE

TECHNICAL FIELD

The present invention relates generally to vehicles and, more particularly, to a control system for a vehicle.

BACKGROUND

All terrain vehicles (ATV's) can be configured for recreational and/or various utility purposes. For example, certain known ATV's can be configured to include a snow-plow blade positioned at the front of the ATV. The ATV can include a device, for example a winch, that can be used to move the blade between a lower, snow-plowing position and an upper, disengaged position.

SUMMARY

A control system for a saddle-type vehicle is provided. The control system includes a reverse lever, a hand brake lever, a throttle lever and at least one mount bracket. Each of the reverse lever, the hand brake lever and the throttle lever are pivotably coupled to the at least one mount bracket and the at least one mount bracket is configured to be connected to a first one of a right handlebar and a left handlebar of a saddle-type vehicle.

A saddle-type vehicle is provided that includes at least one front wheel and at least one rear wheel. The saddle-type vehicle also includes a source of motive power and a transmission. The transmission is coupled to the source of motive power and at least one of the at least one front wheel and the at least one rear wheel. The saddle-type vehicle further includes a handlebar assembly and a control system. The handlebar assembly includes a right handlebar and a left handlebar and the control system includes a reverse lever, a hand brake lever and a throttle lever. Each of the reverse lever, the hand brake lever and the throttle lever are pivotably coupled to a first one of the right handlebar and the left handlebar.

According to another embodiment, a vehicle is provided that includes a handlebar assembly having a right handlebar and a left handlebar. The vehicle also includes a control system. The control system includes a reverse lever and a throttle lever. Each of the reverse lever and the throttle lever are pivotably coupled to a first one of the right handlebar and the left handlebar. The reverse lever and the throttle lever are sufficiently spaced apart to prevent an operator of a vehicle from using a single hand to move the reverse lever from a first disengaged position to a first engaged position while simultaneously moving the throttle lever.

BRIEF DESCRIPTION OF THE DRAWINGS

Various embodiments according to the inventive principles will become better understood with regard to the following description, appended claims and accompanying drawings wherein:

DETAILED DESCRIPTION

Figure 1:
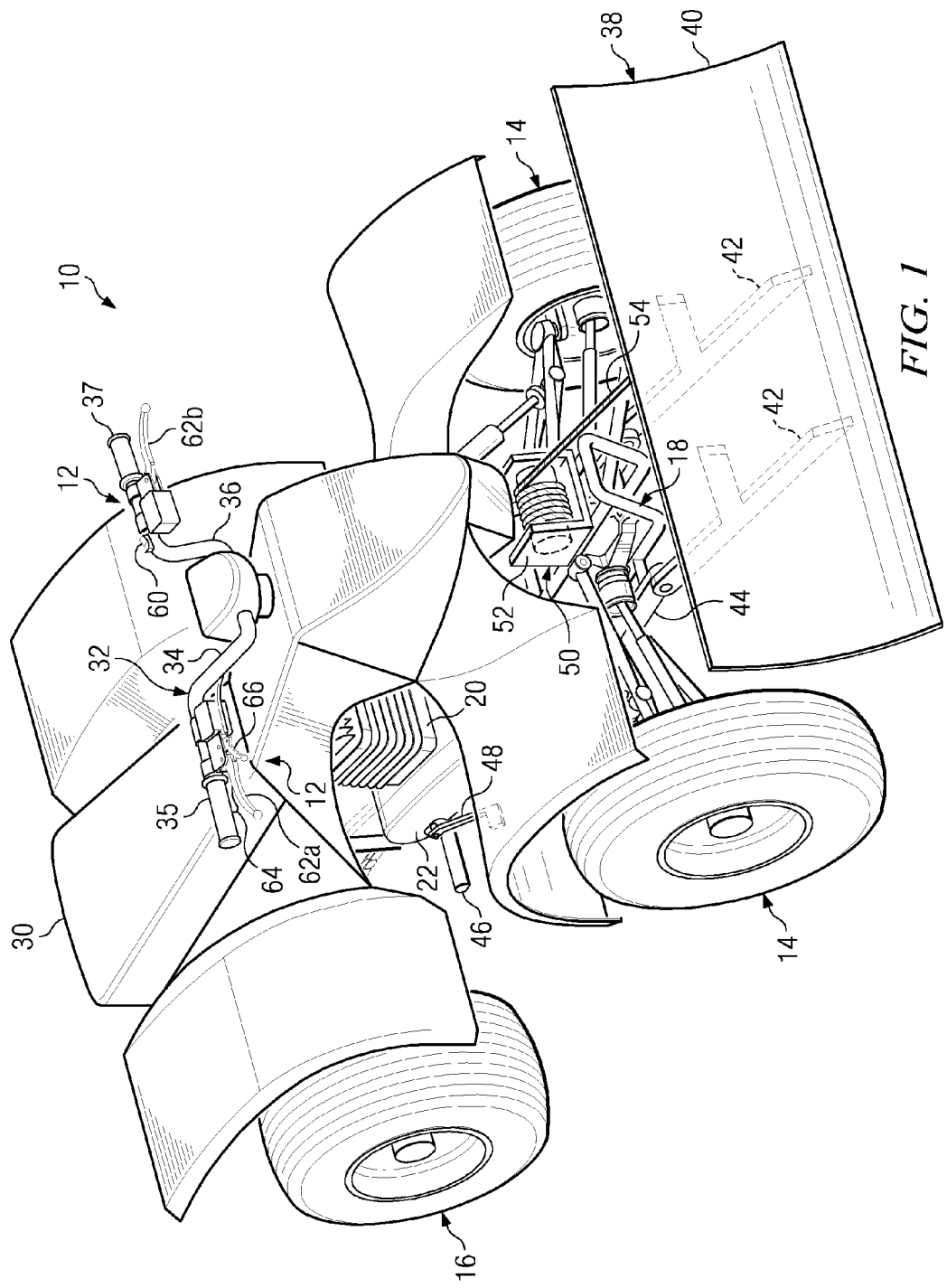
FIG. 1 is a perspective view of a vehicle having a control system according to one embodiment.

Referring to the drawings, wherein like numbers indicate the same or corresponding elements throughout the views, FIG. 1 illustrates a vehicle 10 that includes a control system, indicated generally at 12, according to one embodiment. Control systems according to the inventive principles can be used with an all terrain vehicle (ATV) such as vehicle 10 shown in FIG. 1, or with a variety of other saddle-type or other vehicles configured for recreational and/or utility purposes.

Vehicle 10 can include a pair of front wheels 14 and a pair of rear wheels 16 (one shown). Vehicle 10 includes a frame, indicated generally at 18. The front wheels 14 and rear wheels 16 can be suspended from frame 18 and are rotatable relative to frame 18. Vehicle 10 further includes a source of motive power 20, which can be an internal combustion engine, an electric motor or any other suitable source of motive power. The source of motive power 20 is drivingly connected to a drivetrain that is operable for transferring torque to the front wheels 14 and/or the rear wheels 16. The drivetrain can include a transmission 22 that can be driven by the source of motive power 20.

Vehicle 10 can further include a seat 30 suitable for supporting an operator of vehicle 10 and a handlebar assembly 32 configured for turning the front wheels 14 to steer vehicle 10. Handlebar assembly 32 can include a right handlebar 34 and a left handlebar 36. The right handlebar 34 can include a right hand grip 35 and the left handlebar 36 can include a left handgrip 37.

Vehicle 10 can also include a snow-plow 38 having a blade 40 and a pair of spaced arms 42 integral with the blade 40 and pivotably connected to corresponding links 44 (one shown) attached to frame 18. Vehicle 10 can also be configured to include a winch 50 having a housing 52 attached to frame 18, and a cable 54 attached to the blade 40 for selectively raising and lowering the blade 40. The blade 40 can be positioned in a lower, snow-plowing position (FIG. 1) and can be raised vertically to a disengaged position (not shown). Vehicle 10 can include a pair of foot rests 46 (one shown) and a foot brake lever 48 positioned adjacent one of the foot rests 46. The foot brake lever 48 can be coupled to a rear brake system (not shown) of vehicle 10 to apply a braking force to the rear wheels 16. A lever (not shown), which can be similar to the foot brake lever 48, can be provided on the other side of the vehicle 10 to facilitate shifting of gears within the transmission 22.

Control system 12 can include a winch control device 60 (FIG. 1), which can include a switch, push buttons, or any other suitable control device, which can be coupled to the left handlebar 36 as shown in FIG. 1. Control system 12 can also include a pair of hand levers, at least one of which can be a hand brake lever. For example, a hand brake lever 62a can be coupled to a front and/or rear brake system (not shown) of the vehicle 10. In one embodiment, a hand lever 62b can also be configured as a hand brake lever which can be coupled to a front and/or rear brake system of the vehicle 10. In another embodiment, the hand lever 62b can be configured as a clutch control lever and coupled with the transmission 22 of the vehicle.

Figure 2:
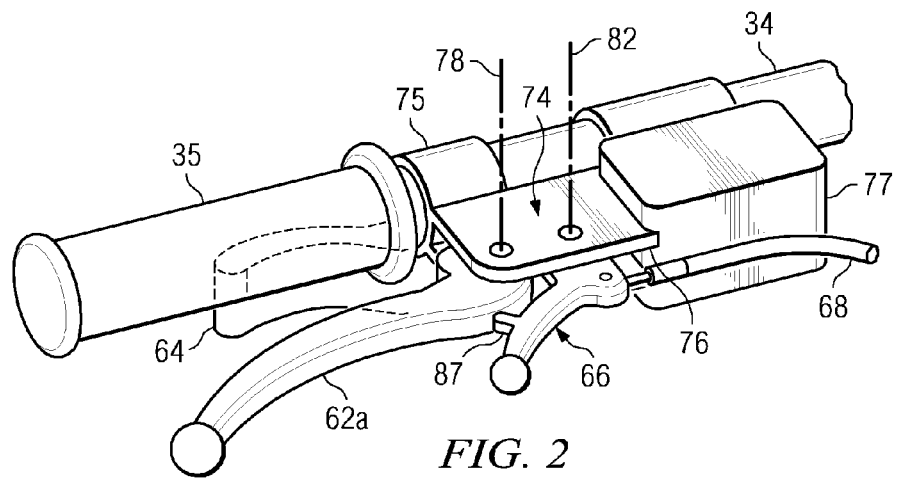
FIG. 2 is a perspective view of a portion of the control system and a portion of the associated handlebar shown in FIG. 1.
Figure 3A:
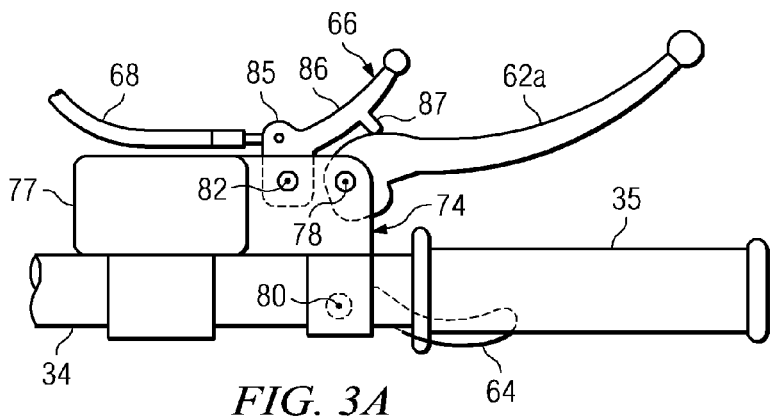
FIG. 3A is a top plan view of the portion of the control system and the portion of the associated handlebar shown in FIG. 2, with each of a reverse lever and a hand brake lever of the control system shown in a disengaged position and with a throttle lever of the control system shown in an engaged position.
Figure 3B:
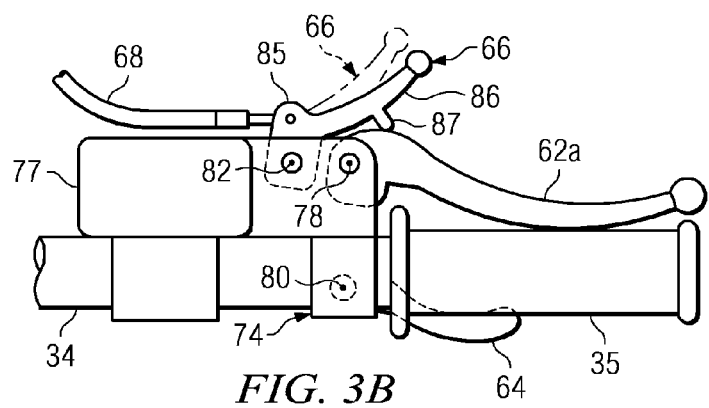
FIG. 3B is a top plan view similar to FIG. 3A, but with each of the reverse lever and the hand brake lever shown in solid line in an engaged position, with the reverse lever shown in dashed line in the disengaged position and with the throttle lever shown in a disengaged position.

Control system 12 can also include a throttle lever 64 that can be coupled to a fuel system component (not shown) of vehicle 10 and a reverse lever 66 that can be coupled to a drivetrain component of vehicle 10. For example, the reverse lever 66 can be coupled to the transmission 22 of vehicle 10 via various conventional means, such as a Bowden cable 68 (FIGS. 2, 3A and 3B). Various other cables that can be included in control system 12, with each being associated with one the winch control device 60, hand brake lever 62a, hand lever 62b and throttle lever 66, are not shown in FIGS. 1, 2, 3A and 3B for purposes of illustration. Use of the reverse lever 66 can, in one embodiment, enable selection of a reverse gear by an operator through use of a gear selection device, for example a foot-operated shift lever. In another embodiment, use of the reverse lever 66 can place the vehicle into a reverse gear. The hand brake lever 62a, the throttle lever 64 and the reverse lever 66 can each be pivotably coupled to the right handlebar 34. In another embodiment (not shown), a hand brake lever, a throttle lever and a reverse lever can each be pivotably coupled to a left handlebar of a vehicle and a winch control device can be connected to a right handlebar of the vehicle.

The control system 12 can also include a mount bracket 74 that can be connected to the right handlebar 34 as shown in FIGS. 1, 2, 3A and 3B. The hand brake lever 62a, the throttle lever 64 and the reverse lever 66 can be pivotably coupled to the mount bracket 74. In one embodiment, mount bracket 74 can include a ring member 75 connected to the right handlebar 34 and a plate 76 integral with the ring member 75. The plate 76 can engage a hydraulic reservoir 77 that can also be connected to the right handlebar 34 as shown in FIGS. 1, 2, 3A and 3B. However, it will be appreciated that a mount bracket can be connected to a handlebar in any of a variety of other suitable arrangements. One or more fluid conduits that can be associated with hydraulic reservoir 77 are not shown for purposes of illustration.

Figure 4:
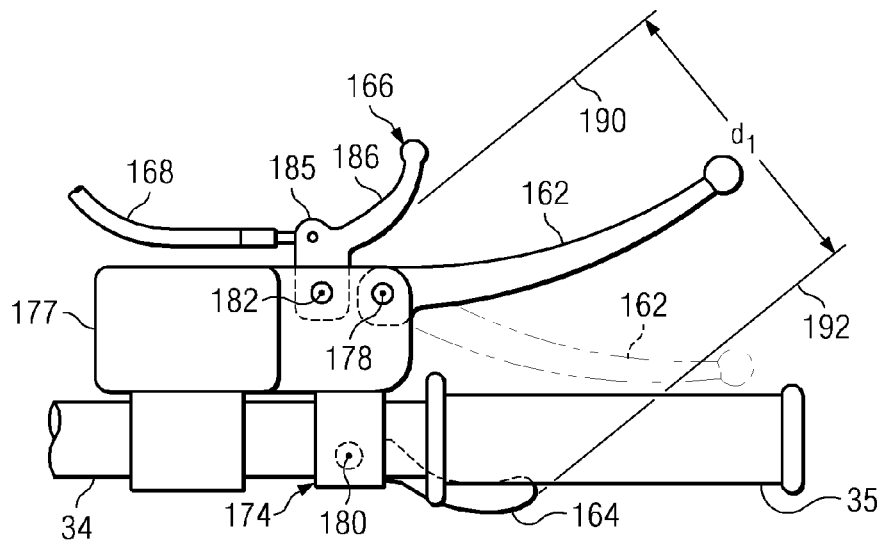
FIG. 4 is a top plan view of a portion of a control system and an associated handlebar according to another embodiment.

The hand brake lever 62a can be pivotable between a disengaged position shown in FIG. 3A and an engaged position shown in FIG. 3B about a pivot axis 78 (FIGS. 2, 3 and 4). The throttle lever 64 can be pivotable between a disengaged position shown in FIG. 3B and an engaged position shown in FIG. 3A about a pivot axis 80 (FIGS. 3A and 3B). The reverse lever 66 can be pivotable between a disengaged position shown in solid line in FIG. 3A and in dashed line in FIG. 3B, and an engaged position shown in solid line in FIG. 3B about a pivot axis 82 (FIGS. 2, 3 and 4). Pivot axes 78 and 82 can be parallel with one another as shown in FIG. 2. Pivot axis 80 might also be parallel with one or both of the pivot axes 78 and 82. As shown in FIGS. 3A and 3B, pivot axes 78, 80 and 82 can be spaced apart from one another. In another embodiment (not shown), a hand brake lever and a reverse lever can be provided that can pivot about a common axis.

The reverse lever 66 and the hand brake lever 62a can be configured and positioned relative to one another so that the reverse lever 66 is prevented from pivoting from the disengaged position to the engaged position when the hand brake lever 62a is in the disengaged position shown in FIG. 3A. In one embodiment, the reverse lever 66 can include a mount portion 85 that can be pivotably coupled to the mount bracket 74, a grasping portion 86 integral with the mount portion 85 and a tab 87, or other suitable protrusion, which is integral with the grasping portion 86. Tab 87 can be disposed in contacting engagement with the hand brake lever 62a when the hand brake lever 62a is in the disengaged position shown in FIG. 3A. The contacting engagement of tab 87 with the hand brake lever 62a prevents the reverse lever 66 from pivoting between the disengaged and engaged positions about pivot axis 82 until the hand brake lever 62a is pivoted from the disengaged position toward the engaged position. As shown in FIG. 3B, once the hand brake lever 62a is moved to the engaged position, and the reverse lever 66 is also moved to the engaged position, the tab 87 can again be in contacting engagement with the hand brake lever 62a.

Figure 5A:
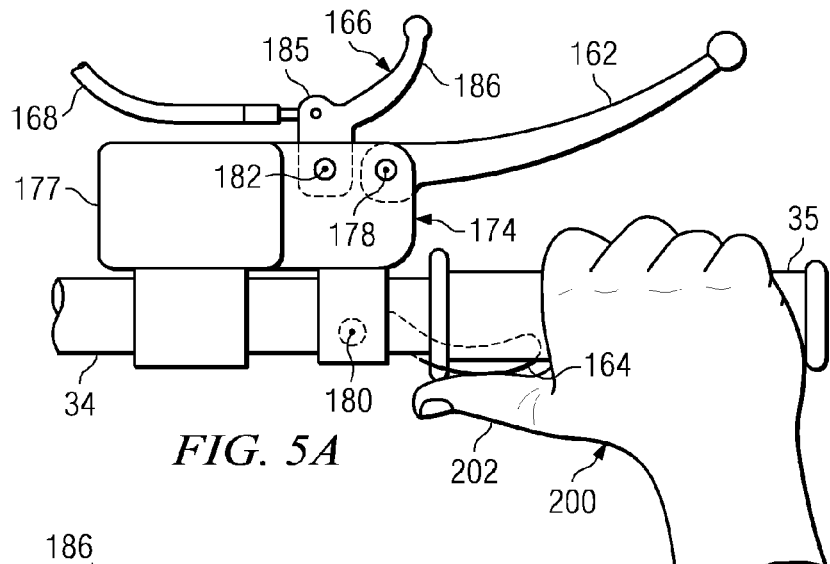
FIG. 5A is a top plan view of the portion of the control system and the associated handlebar shown in FIG. 4, with each of a reverse lever and a hand brake lever of the control system shown in a disengaged position and with an operator's hand depressing an included throttle lever of the control system so that the throttle lever is in an engaged position.
Figure 5B:
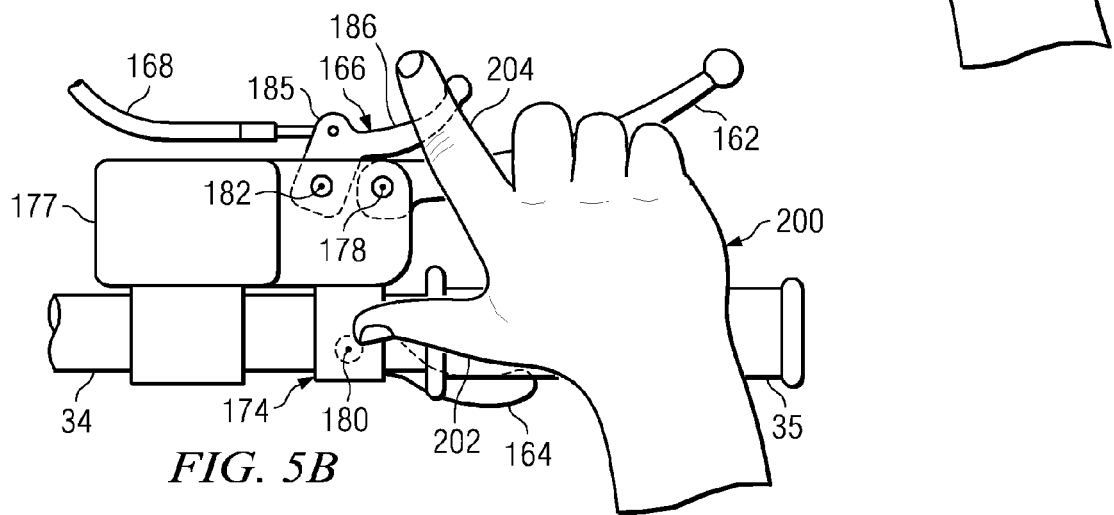
FIG. 5B is a top plan view of the portion of the control system and associated handlebar shown in FIGS. 4 and 5A, but with the operators hand disengaged from the throttle lever and engaged with the reverse lever, with the reverse lever being shown in an engaged position.

FIGS. 4, 5A and 5B illustrate a portion of a control system according to another embodiment that can include a hand brake lever 162, a throttle lever 164 and a reverse lever 166. The hand brake lever 162, the throttle lever 164 and the reverse lever 166 can each be pivotably coupled to the right handlebar 34 as shown in FIGS. 4, 5A and 5B. The control system according to this embodiment can also include a winch control device, such as the winch control device 60 shown in FIG. 1, and can be used on vehicle 10 in lieu of the control system 12. The throttle lever 164 can be coupled to a fuel system component (not shown) of vehicle 10 and the reverse lever 166 can be coupled to a drivetrain component of vehicle 10 such as transmission 22 via various conventional means, such as a Bowden cable 168. Other cables that can be included in the control system according to this embodiment, with each being associated with one of the hand brake lever 162 and the throttle lever 164, are not shown for purposes of illustration. A second hand lever (not shown) can be provided for control of a brake or a clutch, for example, and can be associated with the left handlebar 36. In another embodiment, a throttle lever, a reverse lever and a hand brake lever can be pivotably coupled to the left handlebar of a vehicle, with a winch control device being connected to the right handlebar of the vehicle.

The hand brake lever 162, the throttle lever 164 and reverse lever 166 can be pivotably coupled to a mount bracket 174 that can be connected to the right handlebar 34 as shown in FIGS. 4, 5A and 5B. In one embodiment, the mount bracket 174 can include a ring member connected to the right handlebar 34 and a plate integral with the ring member. The plate of mount bracket 174 can engage a hydraulic reservoir 177 that can also be connected to the right handlebar 34 as shown in FIGS. 4, 5A and 5B. One or more fluid conduits that can be associated with the hydraulic reservoir 177 are not shown for purposes of illustration. The reverse lever 166 can include a mount portion 185 that can be pivotably coupled to the mount bracket 174, and a grasping portion 186 integral with the mount portion 185. The hand brake lever 162 can be pivotable between a disengaged position shown in solid line in FIGS. 4, 5A and 5B, and an engaged position shown in dashed line in FIG. 4, about a pivot axis 178. The throttle lever 164 can be pivotable between a disengaged position shown in FIGS. 4 and 5B, and an engaged position shown in FIG. 5A, about a pivot axis 180. The reverse lever 166 can be pivotable between a disengaged position shown in FIGS. 4 and 5A and an engaged position shown in FIG. 5B, about a pivot axis 182. The pivot axes 178 and 182 can be parallel with one another. Pivot axis 180 might also be parallel with one or both of the pivot axes 178 and 182.

The reverse lever 166 and the throttle lever 164 can be spaced apart by a distance "$d_1$" that can be generally perpendicular to a line 190 that is generally tangent to the reverse lever 166 and that can also be generally perpendicular to a line 192 that is generally tangent to the throttle lever 164, as shown in FIG. 4. In FIG. 5A, a hand 200 of an operator of vehicle 10 is shown to be grasping the right hand grip 35 of the right handlebar 34, with a thumb 202 of hand 200 depressing the throttle lever 164 so that the throttle lever 164 is in an engaged position. As a result, vehicle 10 can be accelerated. Distance "$d_1$" can be selected, i.e. the throttle lever 164 and the reverse lever 166 can be positioned relative to one another, so that the reverse lever 166 and the throttle lever 164 are sufficiently spaced apart to prevent an operator of vehicle 10 from moving the reverse lever 166 from the disengaged position to the engaged position and simultaneously moving the throttle lever 164 with a single hand, such as hand 200. For example, as shown in FIG. 5B, the thumb 202 of hand 200 must be disengaged from the throttle lever 164 to permit a forefinger 204 of hand 200 to engage (i.e., by grasping or pulling) the grasping portion 186 of the reverse lever 166. The reverse lever 166 and the hand brake lever 162 can be positioned in sufficient proximity to permit an operator of vehicle 10 to simultaneously engage the reverse lever 166 and the hand brake lever 162 with a single hand, such as hand 200, as shown in FIG. 5B.

When certain conventional all terrain vehicles are used for snow-plowing, a reverse lock out arrangement and a device used to control the height of the snow-plow blade, for example a winch controller, can be mounted on the same side of the vehicle, for example on the left side. This can result in wasted hand motion and can make shifting and simultaneous blade height adjustment difficult. This may be appreciated when considering the following typical sequence of operations during snow-plowing: plow snow with vehicle moving in a forward direction; stop vehicle; lift snow-plow blade; put vehicle in reverse gear and back up; lower snow-plow blade; put vehicle in forward gear; and repeat sequence as required.

Utilization of control systems according to the inventive principles can facilitate more efficient operation of all terrain vehicles used for snow-plowing. In particular, such control systems eliminate wasted hand motion and make simultaneous adjustment of the snow plow blade height and gear selection possible. Additionally, it can be achieved while preventing simultaneous engagement of the throttle and reverse levers. For example, as shown in FIGS. 1, 2, 3A and 3B, the winch control device 60 that can be included in control system 12 can be connected to one handlebar, for example the left handlebar 36, while each of the hand brake lever 62a, throttle lever 64 and reverse lever 66 can be pivotably coupled to the other handlebar, for example the right handlebar 34. This allows an operator of vehicle 10 to use one hand to raise and lower the blade 40 of snow-plow 38, while using the other hand to operate the hand brake lever 62a, the throttle lever 64 and the reverse lever 66. As described previously, it can be necessary to pivot the hand brake lever 62a from the disengaged position toward the engaged position before the reverse lever 66 can be engaged, thereby providing an interlock feature.

Similarly, in the control system shown partially in FIGS. 4, 5A and 5B, the winch control device 60 that can be included in this control system can be connected to one handlebar, for example the left handlebar 36, while each of the hand brake lever 162, the throttle lever 164 and the reverse lever 166 can be pivotably coupled to the other handlebar, for example the right handlebar 34. Accordingly, this control system also allows an operator of vehicle 10 to use one hand to raise and lower the blade 40 of snow-plow 38, while using the other hand to operate the hand brake lever 162, the throttle lever 164 and the reverse lever 166. The hand brake lever 162, the throttle lever 164 and the reverse lever 166 can be positioned relative to one another to prevent an operator of vehicle 10 from moving the reverse lever 166 from the disengaged position to the engaged position while simultaneously moving the throttle lever 164 with a single hand, but to permit simultaneous engagement of the reverse lever 166 and the brake lever 162 with a single hand. It will be appreciated that control systems according to the inventive principles can also provide advantages during other driving conditions (i.e., when not plowing) of all terrain vehicles or other vehicles.

While the inventive principles have been illustrated by the description of various embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is therefore not limited to the specific details, representative apparatus, methods and examples shown and described. Accordingly, departures may be made from such details without departing from the scope or spirit of the general inventive principles.

What is claimed is:

1. A control system for a vehicle, the control system comprising:
   a reverse lever;
   a hand brake lever;
   a throttle lever; and
   at least one mount bracket; wherein
   each of the reverse lever, the hand brake lever and the throttle lever is pivotably coupled to the at least one mount bracket; and
   the at least one mount bracket is configured to be connected to a first one of a right handlebar and a left handlebar of a vehicle.

2. The control system of claim 1, wherein:
   the reverse lever and the throttle lever are spaced apart.

3. The control system of claim 2, further comprising:
   a winch control device; wherein
   the winch control device is configured to be coupled to a second one of the left handlebar and the right handlebar of a vehicle.

4. The control system of claim 2, wherein:
   the reverse lever is pivotable between a first disengaged position and a first engaged position about a first pivot axis;
   the hand brake lever is pivotable between a second disengaged position and a second engaged position about a second pivot axis;
   the throttle lever is pivotable between a third disengaged position and a third engaged position about a third pivot axis;
   the first, second and third pivot axes are spaced apart from one another; and
   the first pivot axis is parallel with the second pivot axis.

5. The control system of claim 1, wherein:
   the reverse lever and the hand brake lever are configured and positioned relative to one another so that the reverse lever is prevented from pivoting from a first disengaged position to a first engaged position when the hand brake lever is in a second disengaged position.

6. The control system of claim 5, wherein:
the reverse lever comprises a grasping portion and a tab integral with and protruding from the grasping portion; and
the tab of the reverse lever contacts the hand brake lever when the hand brake lever is in the second disengaged position.

7. The control system of claim 6, further comprising:
a winch control device; wherein
the winch control device is configured to be coupled to a second one of the left handlebar and the right handlebar of a vehicle.

8. The control system of claim 6, wherein:
the reverse lever is pivotable between the first disengaged position and the first engaged position about a first pivot axis;
the hand brake lever is pivotable between the second disengaged position and a second engaged position about a second pivot axis;
the throttle lever is pivotable between a third disengaged position and a third engaged position about a third pivot axis;
the first, second and third pivot axes are spaced apart from one another; and
the first pivot axis is parallel with the second pivot axis.

9. A vehicle comprising:
at least one front wheel;
at least one rear wheel;
a source of motive power;
a transmission coupled to the source of motive power and at least one of the at least one front wheel and the at least one rear wheel;
a handlebar assembly comprising a right handlebar and a left handlebar;
at least one mount bracket; and
a control system; wherein
the control system comprises a reverse lever, a hand brake lever and a throttle lever;
each of the reverse lever, the hand brake lever and the throttle lever is pivotably coupled to the at least one mount bracket; and
the at least one mount bracket is connected to a first one of the right handlebar and the left handlebar.

10. The vehicle of claim 9, wherein:
the reverse lever and the throttle lever are spaced apart.

11. The vehicle of claim 10, further comprising:
a winch control device; wherein
the winch control device is coupled to a second one of the left handlebar and the right handlebar; and
the vehicle is an all terrain vehicle.

12. The vehicle of claim 10, wherein:
the reverse lever is pivotable between a first disengaged position and a first engaged position about a first pivot axis;
the hand brake lever is pivotable between a second disengaged position and a second engaged position about a second pivot axis;
the throttle lever is pivotable between a third disengaged position and a third engaged position about a third pivot axis;
the first, second and third pivot axes are spaced apart from one another; and
the first pivot axis is parallel with the second pivot axis.

13. The vehicle of claim 9, wherein:
the reverse lever and the hand brake lever are configured and positioned relative to one another so that the reverse lever is prevented from pivoting from a first disengaged position to a first engaged position when the hand brake lever is in a second disengaged position.

14. The vehicle of claim 13, wherein:
the reverse lever comprises a grasping portion and a tab integral with and protruding from the grasping portion; and
the tab of the reverse lever contacts the hand brake lever when the hand brake lever is in the second disengaged position.

15. The vehicle of claim 14, further comprising:
a winch control device; wherein
the winch control device is coupled to a second one of the left handlebar and the right handlebar; and
the vehicle is an all terrain vehicle.

16. The vehicle of claim 14, wherein:
the reverse lever is pivotable between the first disengaged position and the first engaged position about a first pivot axis;
the hand brake lever is pivotable between the second disengaged position and a second engaged position about a second pivot axis;
the throttle lever is pivotable between a third disengaged position and a third engaged position about a third pivot axis;
the first, second and third pivot axes are spaced apart from one another; and
the first pivot axis is parallel with the second pivot axis.

17. A vehicle comprising:
a handlebar assembly comprising a right handlebar and a left handlebar;
a control system comprising a reverse lever and a throttle lever spaced from the reverse lever, each of the reverse lever and the throttle lever is pivotably coupled to a first one of the right handlebar and the left handlebar;
a hand brake lever pivotably coupled to the first one of the right handlebar and the left handlebar; and
a winch control device coupled to a second one of the left handlebar and the right handlebar; wherein
the reverse lever is pivotable between a first disengaged position and a first engaged position about a first pivot axis;
the hand brake lever is pivotable between a second disengaged position and a second engaged position about a second pivot axis;
the throttle lever is pivotable between a third disengaged position and a third engaged position about a third pivot axis; and
the first pivot axis is parallel with the second pivot axis.

* * * * *